United States Patent Office 2,963,451
Patented Dec. 6, 1960

2,963,451

PRODUCTION OF PHOSPHORUS-CONTAINING POLYESTER RESINS

Harold Coates, Wombourn, England, assignor, by mesne assignments, to Albright & Wilson (Mfg.) Limited, London, England, a British company No Drawing. Filed Mar. 7, 1957, Ser. No. 644,465

Claims priority, application Great Britain Mar. 9, 1956

10 Claims. (Cl. 260—2)

This invention relates to a new method of preparing phosphorus-containing polyesters which are useful as components in the manufacture of flame-resistant resins, paints and lacquers and also in the manufacture of lubricant additives and hydraulic fluids.

It is known that the series of compounds known as dialkyl phosphites $(RO)_2POH$, in which R is an alkyl group, may be prepared by a transesterification reaction between another dialkyl phosphite $(R'O)_2POH$ in which R' is an alkyl group containing a smaller number of carbon atoms than does R, and a higher alcohol ROH. R' is preferably methyl or ethyl (cf. Malowan, Inorganic syntheses, 1953, vol. IV, p. 61).

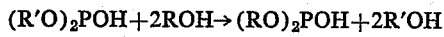

It has now been found that this transesterification reaction affords a convenient method of preparing a new type of polyester and in accordance with the present invention there is provided a process for the production of a phosphorus-containing polyester which comprises effecting a transesterification reaction between a dialkyl phosphite and an alkylene glycol. The reaction may be expressed graphically as follows:

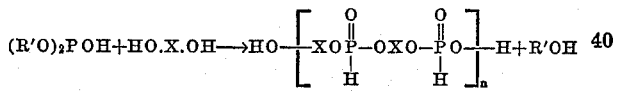

where X is an alkylene hydrocarbon residue and $n$ is an integer.

The above reaction may be carried out with any of the usual alkylene glycols, for example ethylene glycol, tetramethylene glycols, pentamethylene glycol and other glycols containing branched chains, e.g. hexylene glycol (2-methyl-pentanediol-2:4).

A convenient manner of carrying out the process is as follows:

A mixture of the alkylene glycol and the dialkyl phosphite, preferably dimethyl or diethyl phosphite, is heated under an inert, e.g. a nitrogen, atmosphere is a distillation apparatus at such a temperature that the monohydric alcohol produced in the transesterification is distilled off. The temperature is gradually raised until no more lower alcohol will distil. The transesterification is taken as far as possible by finishing the heating under gradually diminishing pressure, finally at such a temperature and pressure that any unreacted glycol is distilled off. A preferable temperature range for the heating process is from 80°–200° C. but the most suitable temperature varies with the dialkyl phosphite and the glycol used. If desired, a transesterification catalyst, such as metallic sodium or magnesium, sodium amide or sodium alkoxide and the corresponding potassium or magnesium compounds, may be added to speed up the reaction. Any of the catalysts common to the transesterification art may be used, including acids such as phosphoric acid.

The molecular ratio of the reactants may be varied widely, but a preferable ratio is such that the dialkyl phosphite and the glycol are in the mole ratio of 1:1 to 1:1.5.

The manner in which the reaction may be carried out will be apparent from the examples.

*Example 1*

A mixture of dimethyl phosphite (110 g. 1 mole), ethylene glycol (93 g. 1.5 moles), sodium (0.1 g.) and metallic magnesium (0.1 g.) was heated gently in a distillation apparatus under an atmosphere of nitrogen. Methyl alcohol began to distil off when the temperature of the mixture was about 100° C. The temperature was raised very gradually over a period of six hours until a final temperature of 200° C. was reached. Care was necessary during the final stages since, if the temperature is raised too rapidly decomposition may set in at about 200° C.

The mixture was kept at this temperature and all the volatile material distilled off under a nitrogen atmosphere, first at 15 mm. and finally at 0.1 mm. Hg.

When cold, the product was a water-white transparent glassy material which would just flow extremely slowly when the container was inverted.

*Example 2*

A mixture of dimethyl phosphite (110 g. 1 mole), ethylene glycol (80.6 g. 1.3 moles) and sodium (0.1 g.) was heated gradually under a nitrogen atmosphere exactly as described in Example 1 giving a transparent, colourless viscous product having a viscosity at 25° C. of 223 poises.

*Example 3*

A mixture of diethyl phosphite (138 g. 1 mole), ethylene glycol (93 g. 1.5 moles), sodium (0.1 g.) and magnesium (0.1 g.) was heated gently in a distillation apparatus under a nitrogen atmosphere, exactly as described in Example 1, attaining a maximum temperature of 180° C. Volatile materials were distilled out at this temperature, as described in Example 1, giving a colourless transparent product of the consistency of treacle at room temperature.

*Example 4*

A mixture of dimethyl phosphite (55 g. 0.5 mole), 1:5-pentanediol (78 g. 0.75 mole) and sodium (0.1 g.) was reacted, as described in Example 1, to a final temperature of 180° C. The produce was a colourless, transparent viscous oil at room temperature.

I claim:

1. A process for the production of a phosphorus-containing polyester which comprises effecting a transesterification reaction between a dialkyl phosphite and an alkylene glycol.

2. A process according to claim 1 wherein the alkylene glycol is a polymethylene glycol.

3. A process according to claim 1 wherein the transesterification reaction is carried out at a temperature at which the monohydric alcohol produced distills from the reaction mixture.

4. A process according to claim 1 wherein the reaction is carried out in an inert atmosphere.

5. A process according to claim 1 wherein the reaction is carried out whilst gradually diminishing the pressure below atmospheric pressure.

6. A process according to claim 1 wherein the reaction is carried out at temperatures in the range of 80° to 200° C.

7. A process according to claim 1 wherein the reaction is carried out in the presence of a tranesterification catalyst.

8. A process according to claim 1 wherein the molar ratio of the dialkyl phopshite to the alkylene glycol is between 1:1 and 1:1.5.

9. A process for the production of a phosphorus-containing polyester which comprises heating a mixture of a dialkyl phosphite and a polymethylene glycol in the presence of a transesterification catalyst at a gradually increasing temperature within the range of 80° C. to 200° C. under an inert atmosphere and gradually diminishing pressure below atmospheric pressure whilst continuously removing, by distillation, the formed monohydric alcohol and finally distilling unreacted glycol from the reaction mixture.

10. A liquid phosphorus-containing polyester which is the transesterification product of a dialkyl phosphite and an alkylene glycol.

References Cited in the file of this patent

UNITED STATES PATENTS 2,382,622    Toy _____ Aug. 14, 1945

OTHER REFERENCES

Lucas et al.: Jour. Am. Chem. Soc., vol. 72, 1950, pp. 5491–7.